United States Patent [19]
Leiste et al.

[11] 3,945,535
[45] Mar. 23, 1976

[54] INJECTION MOLDING APPARATUS

[75] Inventors: Hans Peter Leiste, Kirchhundem; Helmut Eckardt, Hilchenbach-Dahlbruch, both of Germany

[73] Assignee: Schloemann-Siemag Aktiengesellschaft, Dusseldorf, Germany

[22] Filed: Aug. 5, 1974

[21] Appl. No.: 494,462

[30] Foreign Application Priority Data
Aug. 11, 1973 Germany............................ 2340772

[52] U.S. Cl. .......................... 222/146 HE; 425/243
[51] Int. Cl.² ........................................... B67D 5/62
[58] Field of Search.................. 222/146 HE, 146 C; 264/DIG. 83, DIG. 14, 46.1; 425/245, 243

[56] References Cited
UNITED STATES PATENTS

| 2,684,105 | 7/1954 | Graves............................ 222/146 HE |
| 3,608,145 | 9/1971 | Baker et al. ................. 264/DIG. 14 |
| 3,716,318 | 2/1973 | Erik et al............................. 425/245 |
| 3,741,704 | 6/1973 | Beasley.............................. 425/245 |
| 3,857,914 | 12/1974 | Aishima............................. 264/46.1 |

Primary Examiner—Robert B. Reeves
Assistant Examiner—Hadd S. Lane
Attorney, Agent, or Firm—Norman S. Blodgett; Gerry A. Blodgett

[57] ABSTRACT

Apparatus for feeding to a mold a plasticized synthetic material containing a foaming agent, the apparatus using a heated extruder and its associated transfer cylinder which emits the material in a thin stream by means of a nozzle.

8 Claims, 2 Drawing Figures

INJECTION MOLDING APPARATUS

BACKGROUND OF THE INVENTION

By means of the present apparatus, the synthetic material is melted in the heated extruder and homogenized at the same time. The foaming agent may have already been added to the synthetic material or may be mixed with it in the extruder. The foaming agents liberate the expanding gases by thermal separation, so that the plastic must be heated above the separation temperature, while it is kept under a pressure such that the foaming up of the plastic is completely prevented. Therefore, this temperature can only be surpassed at the extruder exit. It was, therefore, recommended in German Pat. DT-OS No. 1,932,437, that heating above this temperature can only take place in the connection between the extruder and the transfer cylinder. It is also well known, as per German Pat. DT-AS No. 1,233,578 and also per German Pat. DT-OS No. 1,903,540, that the plastic should only be heated above the separation temperature in the transfer cylinder proper or at its exit, in the area of the nozzle. This is true whether the foaming agent is liquid or gas forming; the pressure existing at any given time must surpass the vapor pressure of the foaming agent at the existing temperature.

In all these cases a homogenous plasticized synthetic material will be formed, which will expand and fill up the mold, due to the pressure relief. The particles of the synthetic material which are nearest to the surface of the mold cavity will be cooled so fast that they foam very little and will lay on the mold cavity wall in a very smooth state. On the other hand, in the areas separated from the walls, foaming will occur, so that the resulting casting entirely fills the cavity despite the shrinkage of the synthetic material during the cooling process. A casting will be produced which, by the effect of the massive and stable limit zones, will have an average density which will fall well below that of the synthetic material, because of the presence of the captive bubbles. The problem still appears that, even with polished cavity surfaces, synthetic materials containing foaming agents have a tendency to form castings with a superficial texture. If, however, a given texture is desired, it is possible to form the walls of the cavity with markings or texture, without the need of additional structure.

In order to suppress such texture, it has already been proposed that the pressure existing in the cavity must be increased at least momentarily, or otherwise, the charge being brought into the cavity must be separated into two components as per German Pat. DT-AS No. 1,778,457, such that one is free of foaming agent and the other containing the foaming agent. For carrying out this process, a machine can be used which introduces the charges one after the other; two extruders with corresponding transfer cylinders can be foreseen, which would be connected to a single nozzle by means of valves, and working together with the former, guiding pieces connected in series. These transfer cylinders can also be, as per German Pat. DI-OS No. 2,241,002, made to work partially in parallel, where the middle of the stream is formed by the expelled contents of one of the cylinders, while the extruded material from the other is located at the outside of the stream. In this way, one can be sure that the extruded material containing foaming agent will be completely surrounded by extruded material free from foaming agent. The necessary expense is relatively high, because one not only must take into account the fact that the extruder and the transfer cylinder are duplicated, but also that both cylinders fed separately must impel the outgoing synthetic material in synchronism, so that efficient and fast acting valves as well as accurate controls are required.

Difficulties are also experienced in the lead bodies and also during the gliding of the synthetic material masses against each other, after they are led together. Further problems appear by the change in the masses of synthetic, for example, for a color change. In this case, it will be necessary to completely regulate the action of the two extruders, the two transfer cylinders and the complicated extra-flow arrangement, because otherwise color errors will appear in the extrusion.

The present invention stems from the task of finding a process for charging a mold with plastic synthetic material containing a foaming agent, with little expense and using simple methods; producing a stream of synthetic material which at the exit from the nozzle and entrance to the mold has an outer limiting zone which does not foam; whereas in a central region of the stream flowing into the mold, the synthetic material foams in the known way. The central region is completely surrounded by the "non-foaming" material of the limiting zone.

SUMMARY OF THE INVENTION

In general, the present invention solves the problem by the additional heating of the inner region of the foaming stream made out of or being made out of synthetic material containing the foaming agent, and the cooling of the outer zone. Thus, the outer zone of the stream entering the mold will have a higher viscosity than that of the inner zone. This higher viscosity of the material of the outer zone causes its "foamability" to be lowered, as compared with that of the material of the inner zone of the stream without allowing the "fitting" against the walls of the cavity to be surpassed beyond the desired value. In addition, any foaming agent contained in the cooler outer part of the stream will react more slowly (or, when its separation temperature is not exceeded, very little or not at all), so that the action obtained through the higher viscosity of the outer zone will be strengthened.

In order to carry out the process, a hollow nozzle needle has been used. This needle is located against the outlet opening of the nozzle and its position is adjustable. It can produce a closing of the nozzle, and is supplied with a ring-shaped protuberance or frontal surface which can rest upon the nozzle opening. It is also equipped with a rod-shaped heating element. This nozzle may have the heating element inside its inner space. A strong heating of the middle zone of the outgoing stream can be accomplished if the heating element is located in a closed tube at the front side which can be attached to the nozzle needle and freely grips through the outlet opening and extends itself in front of the nozzle. In another way, the heating element can also be located in a tube closed in the front, which can axially slide inside the nozzle needle and be pulling the latter backwards, can, at least within some range, be advanced, thanks to the free play of the passage.

The process can also be conducted by the use of a pouring sleeve, which during the changing of the mold remains in contact with the mouthpiece of the nozzle and shares in the resulting cooling of the mold. The use of a cooled pouring sleeve can also be anticipated together with the additional use of a heating element to increase the resulting action. It has been established, in this respect, that at least the side of the pouring sleeve opposing the mouthpiece of the nozzle should be thermally insulated from the mold. The pouring sleeve is best made in the form of a tube and the portion facing the frontal surface of the mold which is turned towards the transfer cylinder remains free. A corresponding outwardly-projecting cooling piece can be mounted on the pouring sleeve. The pouring sleeve and the cooling pieces can be provided to advantage with cooling holes or with a cooling coil for the admission and passage of cooling water. Heating of the inner zone can also be obtained by means of a torpedo having a heating element mounted in the pouring sleeve, in the nozzle, or in the cooling piece. It may be worthwhile to equip the free end of a heating element carrying tube mounted on the nozzle needle with a pouring closure mechanism to a mold, or otherwise with a device which permits the making of the connection with the pouring closure mechanism of a mold.

The heating elements can be electrically heated and constructed as resistors; inductive or capacitive heating is also possible. In such case, the tube carrying the heating element can be built as a spool or as a continuous flow plastic tube provided with a central electrode, or whose outer surface is divided into electrodes. Heating elements can also be constructed as heat exchangers and heated with a heat exchanging medium.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
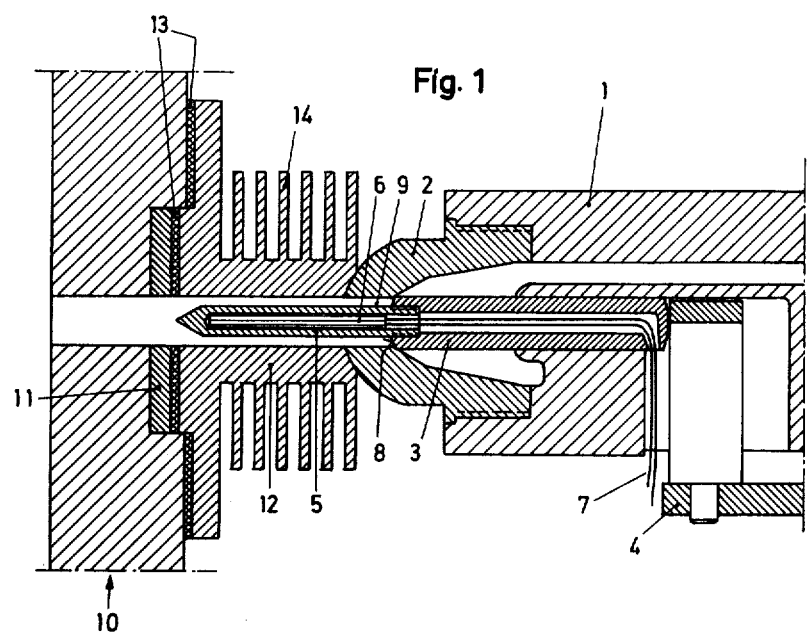
FIG. 1 is a vertical sectional view of apparatus including a nozzle following a transfer cylinder with a heating element preceding a nozzle needle.

FIG. 1 shows a nozzle 1 which is located after a transfer cylinder and its feeding extruder, not shown. The nozzle is shown in section and at its free end is the nozzle closed by the mouthpiece 2. A nozzle needle 3 is centrally located and can be displaced in the axial direction by means of a push rod 4. The nozzle needle, which is constructed with a bore, carries a tube 5 located in the bore and provided with a heating element 6. The heating element contains a heating electric resistance whose leads 7 are guided through the bore in the nozzle needle. The nozzle needle is provided around the tube 5 with a frontal surface 8 which (by sliding the nozzle needle) can be located in contact with the nozzle opening 9 to open and close it.

In FIG. 1 the mouthpiece 2 of the nozzle is located against a mold 10 to be filled, whose pouring sleeve 11 is attached to a cooling box 12. The cooling box 12 is thermally insulated from the mold by means of insulating plates 13, and is also provided with cooling fins 14.

To carry out the process, the transfer cylinder is fed synthetic plasticized material containing foaming agent and with its temperature kept somewhat lower than that which is customary for the same foaming agent, same synthetic material, and otherwise similar conditions. Preferably, the temperature of the synthetic material is maintained slightly under that at which the added foaming agent reacts and separates. In order to fill the mold and/or to proceed with the load, the nozzle needle 3 is pulled backwards, so that its frontal face 8 clears the nozzle opening 9 and the quantity of the load is pressed into the mold through the nozzle. In this way, the inner areas of the tubular stream passing through the nozzle opening 9, will come into contact with the tube 5 which is heated by the heating element 6. Consequently, the synthetic material will be heated to a temperature above that which existed inside the transfer cylinder.

At the same time, the outer zone of the stream which is in contact with the inner face of the cooling box 12, will be cooled so that its temperature will drop. The stream will reunite itself at the frontal face of the tube 5 and enter the mold with a heated inner zone of lower viscosity and a cooler outer zone with higher viscosity. The outer zone of the stream comes into contact with the walls of the cavity and adjust themselves to their surface without the formation of unwanted superficial textures caused by released foaming agent. The inner part of the stream fills the inner part of the cavity and is not affected in its capacity to foam, so that the resulting pouring presents the desired "sandwich" structure: a dense smooth outer skin covering a porous, higher stability nucleus.

The action which takes place through the different viscosities can still be substantially increased by manipulating the temperatures of the outer and inner layers of the synthetic material, so that the separation temperature of one of the solid foaming agents added falls between them. In this way the foaming agent is maintained at a temperature considerably below its separation temperature, so that no foaming gas is produced, while at the same time the temperature at the central zones can be increased to above the separation valve in such a way as to produce the foaming inside the mold with a desired intensity.

The invention is not limited to the cooling of the outer zone and the heating of the middle zone. The desired separation between the temperatures of the inner and outer zones can also be obtained by either only heating the inner zone or by only cooling the outer zone. This cooling and/or heating can also be accomplished inside the nozzle when these zones are supplied with suitable devices, for instance, torpedoes, and heating and/or cooling can be conducted either in the pouring box or in the cooling box of the mold, as well as in the nozzle.

Through another arrangement, not shown, the tube 5 can be made movable lengthwise in the nozzle needle 3. In the exit, the nozzle 3 is pushed forward, so that the frontal surface 8 is against the nozzle opening 9 and the tube 5 is retracted in the bore of the nozzle needle 3. In accordance with the description example of FIG. 1, the synthetic material which surrounds the tube 5 will be peeled off by retracting the nozzle through the cooling box by the frictional action of the passage between the tube 5 and the frontal face 8. The surrounding synthetic material will by this retraction of tube 5 be completely removed.

Figure 2:
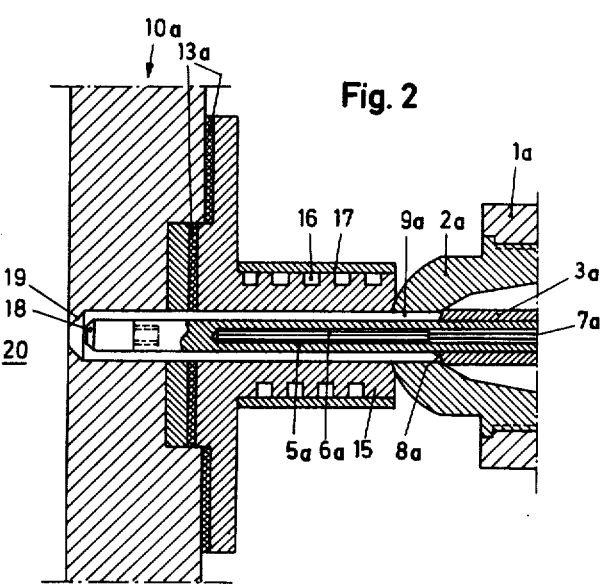
FIG. 2 is a vertical sectional view of a modified form of the invention including the mouthpiece of a nozzle, whose nozzle needle is provided with a heating element and which is connected by a pouring closure mechanism to a mold.

A further apparatus for carrying out the process is shown in FIG. 2. A nozzle needle 3a, which slides axially against the mouthpiece 2a, is shown mounted on which a tube 5a is mounted and contains a heating element 6a. The tube, through the positioning of the nozzle, engages the cooling box 15 of a mold 10a. This cooling box 15 is provided with a rectangular spiral 16 surrounded by a tight box 17, so that a continuous canal is formed to pass cooling water. The enlarged tube 5a is supplied with a thread at its free end so that a stem 18 of a pouring closure can be attached. When the nozzle 1a engages the cooling box 15, the tube 5a with its heating element 6a and the attached stem 18 are moved through the cooling box 15 as well as through the walls of the pouring canal of the mold 10a. Prior to conducting the load, the apparatus appears in the position shown in FIG. 2. In order to carry out the load, the nozzle needle is retracted, but the little tube 5a with the mounted stem 18 remains in the same position, although it is also possible to retract the tube 5a along with the hollow nozzle needle 3a which surrounds it. In this manner the nozzle 1a and the pouring closure 19 are opened and the load can be introduced into the mold cavity 20. Again, as has already been explained, the cooling box will cool the outer zone of the stream which enters the cavity from the nozzle, while its inner zone is heated around the tube 5a by means of the heating element 6a. Because of the good contact between the free end of the tube 5a and the stem 18, there is contribution by the latter to the heat exchange, even when the stem is thermally inert. After the expulsion of the load, the nozzle needle 3a will be positioned with its frontal surface 8a against the nozzle opening 9a and closes the nozzle. The tube 5a likewise slides forward and the stem 18 (which is mounted on its frontal face) closes the pouring closure 19 in such a way that its frontal face is united with the receiving part of the walls of the cavity, so that by cooling, a form free of a mold mark is formed. After sufficient cooling, the tube 5a is retracted in the nozzle needle and the nozzle is removed from its place on the cooling box 15.

In this case also, the invention is not limited to the example described. For example, the tube 5a can be solidly attached to the nozzle if, by use of fine manufacturing tolerances, the frontal surface of the stem is set accurately flush with the walls of the cavity at the position where the mouthpiece 2a and nozzle opening 9a are set in place. The assemblies necessary for a common drive can be simplified if the sliding movement of the tube 5a inside the nozzle needle, is limited and is preloaded by means of a spring toward the closing direction. By retracting the nozzle needle (at least in a second part of the stroke travel) the pouring closure 19 will be opened. By sliding the nozzle opening 9a, the stem 18 under the action of the spring will be pressed against the pouring closure, so that a proper tolerance can be obtained through the spring travel. It is also not necessary to produce the stem 18 and the tube 5a in one piece, or, as shown in FIG. 2, to firmly lock them together. The stem 18 may be axially set in place in the pouring canal and preloaded by a spring, so that the simple act of the engagement of the free end of the tube 5a with the rear surface of the stem 18, will produce such an effect that the union shown in FIG. 2 by use of a screw thread or the like is rendered superfluous. In the same way, a stem 18, longer than that shown in FIG. 2, can be mounted in the pouring canal and be preloaded by means of a spring in the direction of opening of the pouring closure 19. By closing the pouring closure 19 through the forward sliding of the nozzle needle 3a, the tube 5a will press the stem 18 into the closing position. Also, close tolerances can be reduced if the tube 5a is made to slide into the nozzle needle 3a in the longitudinal direction and is kept in place and preloaded against a collar by a spring which is stronger than that of the stem 18. Finally, for the control of the stem 18 a special device may be installed so that it is possible to preload the stem 18 in its closing cycle and to retract it through special devices (by the use of a two arm reversing lever) when the mouthpiece is located in place. Through further coupling it is possible to retract the stem 18 along with the nozzle needle 3a.

The tube 5a, as well as the stem 18 can be supplied with a heating element, so that it contributes to the heating. Finally, the axial driving of the stem can be built as a heated torpedo or, where no pouring closure is supplied, such a torpedo be visualized in the mold.

It has been suggested in the previous discussion that the additional heating, i.e., the heating element 6a, heating elements from torpedoes, or the like, are connected permanently. It may be found to be advantageous to connect these heating elements during a given time before the stroke, during its operation, disconnected again at the end of the stroke, so that over-heating may be reduced without it being necessary to provide controlled connections. Equal temperatures, or spontaneous occurrence of heating, and a simplification of the control of the action of the heating can be obtained by constructing the heating element of the tube 5a, or of a stem, or of a torpedo not as electric resistors, but as electrodes or coils, so that they can be heated electrically through inductive or capacitive action.

In such case, it is possible to obtain not only spontaneous heating of the wall surfaces, but also heating of the mass of the synthetic material itself. Furthermore, it has also been found of value to construct the heating elements as heat exchangers, which through a heat exchanging medium will produce definite temperatures.

The effect to be accomplished by the invention may be also reached or strengthened by equipping the nozzle or mouthpiece with a cooling box or its equivalent. In all these cases it will be possible to arrive at comparatively lower cost methods by which the walls of the mold cavity come in contact only with synthetic material which is at least lower in foaming capacity then that of the material which fills the inner parts of the cavity, so that undesired textures in the wall areas are reduced.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for injecting a plasticized material containing a foaming agent into a mold from an extruder, comprising:
   a. a channel adapted to carry material from the extruder to the mold, the channel having an inner surface,
   b. a nozzle in the channel, the nozzle having a nozzle opening which forms a portion of the channel,
   c. a nozzle needle movable through the nozzle opening and having a frontal surface adapted to selectively close the nozzle opening, d. a heating element adapted to maintain the nozzle needle at a high temperature, e. a cooling system adapted to maintain at least a portion of the inner surface of the channel at a temperature below that of the nozzle needle, and f. carrying means adapted to move the nozzle needle to open and close the nozzle opening.

2. Apparatus as recited in claim 1, wherein the nozzle needle has an elongated central bore.

3. Apparatus as recited in claim 2, wherein the heating element is contained in the bore.

4. Apparatus as recited in claim 1, wherein the needle is adapted to extend a substantial distance through the nozzle opening toward the mold.

5. Apparatus as recited in claim 1, wherein a distributing portion of the channel between the nozzle and the mold is cooled.

6. Apparatus as recited in claim 5, wherein thermal insulating plates are provided at those points on the distributing portion which points are adjacent the mold when the apparatus is operating.

7. Apparatus as recited in claim 5, wherein the distributing portion is provided with cooling passages through which fluid will flow.

8. Apparatus as recited in claim 1, wherein the end of the needle closest to the mold forms a portion of the mold wall when the nozzle is closed.

* * * * *